T. H. ELLIOTT.
FRUIT SEEDER.
APPLICATION FILED NOV. 5, 1907.
981,076.
Patented Jan. 10, 1911.
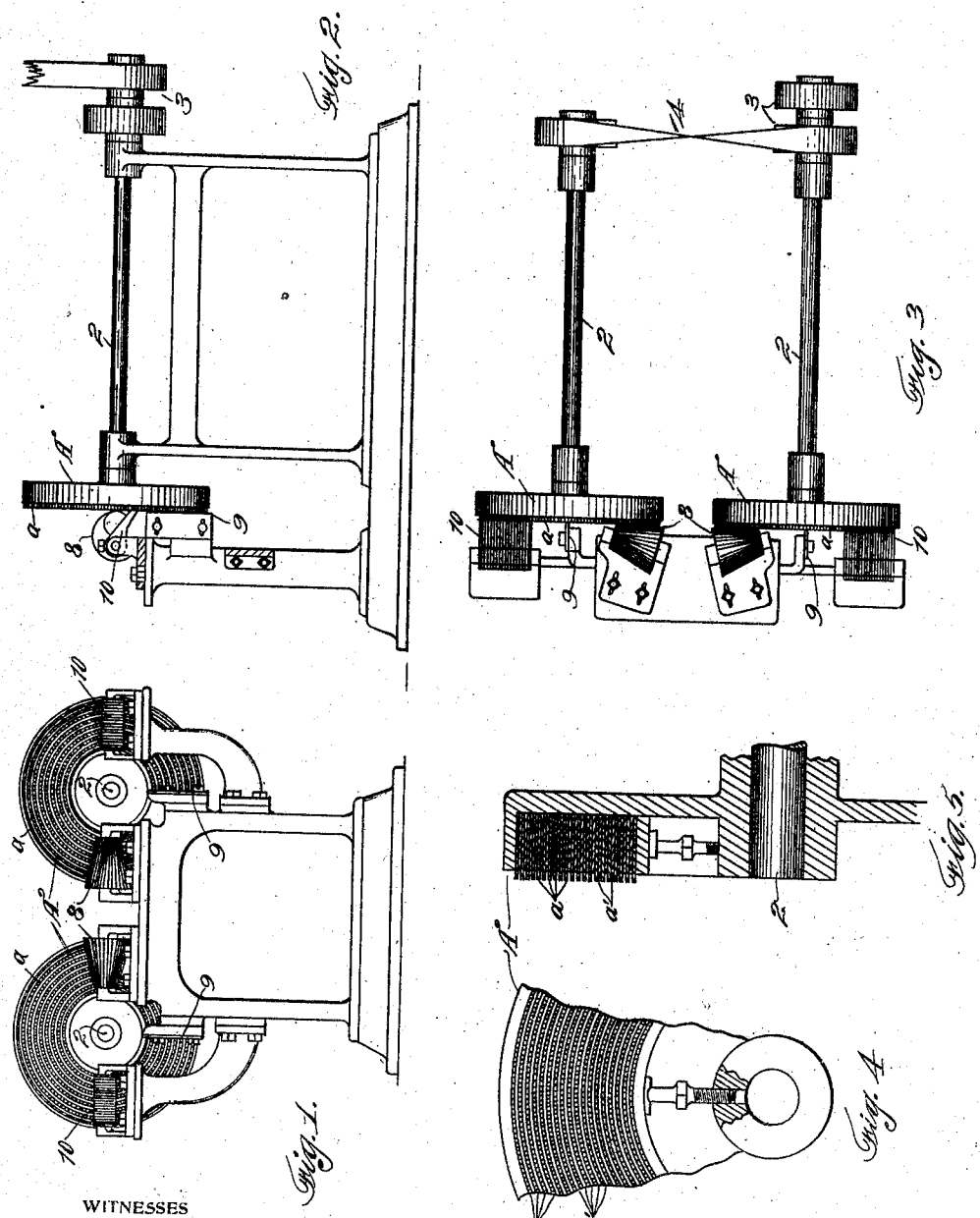
WITNESSES
INVENTOR;
Thomas H. Elliott:
BY Geo. H. Strong.
ATTORNEY.

UNITED STATES PATENT OFFICE.

THOMAS H. ELLIOTT, OF SELMA, CALIFORNIA, ASSIGNOR, BY MESNE ASSIGNMENTS, TO SELMA FRUIT COMPANY, INC., OF SELMA, CALIFORNIA.

FRUIT-SEEDER.

981,076. Specification of Letters Patent. Patented Jan. 10, 1911.

Application filed November 5, 1907. Serial No. 400,741.

*To all whom it may concern:*

Be it known that I, THOMAS H. ELLIOTT, citizen of the United States, residing at Selma, in the county of Fresno and State of California, have invented new and useful Improvements in Fruit-Seeders, of which the following is a specification.

My invention relates to an apparatus and means which is especially designed for removing seeds from raisins and separating the seeds from the fruit.

It consists in a combination of mechanism, and details of construction as hereinafter described and claimed and which will be more fully explained by referring to the accompanying drawings, in which—

Figure 1 is a front view. Fig. 2 is a side view. Fig. 3 is a plan view. Figs. 4 and 5 are details of the tooth disk.

A is a disk of which there may be one or more. In the present case I have shown two of these disks mounted on suitable journal shafts 2. Power is applied to rotate these shafts by means of band-pulleys 3 or equivalent power transmitting devices. In the apparatus here described, a crossed belt 4 extends between the pulleys, and power being applied to either of the shafts 2, will cause the pulleys to revolve in opposite directions. As shown in the present case, the disks A revolve toward each other. These disks, as I have termed them, are preferably made up of independent bands wound upon a central hub or drum. Thus, one of these bands $a$ is formed with teeth or points upon one edge, and this band is fixed upon the drum so that the teeth project from the edge of the band; the second band $a'$ having no teeth upon its edge is then placed around the tooth band, and its edge is at such distance below the points of the teeth as may be required. Another toothed band $a$ is wound upon the second or toothless band $a'$, its teeth being substantially upon the level of the teeth of the first band. Thus, alternate toothed and untoothed bands are wound successively until the diameter of the disk thus formed is as great as required.

The spaces between the teeth of each band and the transverse spaces between the tooth bands are so regulated that the seeds of raisins will not pass between them; and when the raisins are pressed against these teeth, the seeds will be stopped or impaled upon the points of the teeth; while the flesh or meat of the raisins is forced into the channels formed between the projecting teeth of the alternate bands and into the channels which are formed by the smooth-edged spacing bands $a'$ which, as previously stated, do not extend outward as far as the teeth of the first named bands $a$.

In order to force the raisins into this position, I have shown soft faced rubber rollers 8, journaled transversely to the axis of the disks, as plainly shown in the plan view. As these rollers are radial to the axis of the disks, they are made conical in form, so by reason of the larger diameter of the outer ends, the travel of the surface of the rollers which are presented toward the disk will be approximately at the same rate as that of the different parts of the disk surfaces. The machine being in motion, and the raisins being fed between the rollers and the teeth of the disk, the pressure of the rollers will force the raisins into the spaces between the teeth, while the seeds will be stopped or impaled upon the points of the teeth.

Any suitable device may be used for removing the seeds from the teeth, and afterward removing the raisins from the channels between the teeth. In the present instance, I have shown knives or scrapers 9 with the edges so disposed with relation to the teeth, that as the latter pass these scrapers the seeds will be removed from the teeth and discharged at that point. The continued revolution of the toothed disks causes the channels between the teeth to move over fingers or lifters 10, which project from any suitable table or support toward the face of the toothed disk, in such manner that these fingers enter the channels, and the raisins which are carried around within the channels are engaged by these fingers and lifted out of the channels so as to be discharged at a different point from where the seeds have been discharged.

It will be understood that each of these built up disks formed of alternate toothed and untoothed ribbons forms a complete device, the assembling of this device in pairs serving to balance the machine and economize in the manufacture.

Having thus described my invention, what I claim and desire to secure by Letters Patent is—

1. In a fruit seeding machine a continuously rotary disk provided on its working face with an impaling surface composed of thin metallic strips of two constructions set on edge and arranged alternately and in circles concentric with the axis of the disk, the strips of one construction having impaling teeth on the outer edge spaced apart so as to exclude the seeds of the fruit, while the strips of the other construction are of lesser depth and smooth outer edge and such thickness as to exclude the seeds of the fruit from the interstices between the teeth.

2. In a fruit seeding machine a continuously rotary disk provided on its working face with an impaling surface composed of teeth arranged in circles concentric with the axis of the disk and spaced apart so as to exclude the seeds of the fruit from the interstices between the teeth, in combination with an elastic-surfaced roller for impaling the fruit on the teeth.

3. A fruit seeding machine comprising a disk provided with an impaling surface composed of teeth arranged in circles concentric with the axis of the disk and spaced apart so as to exclude the seeds of the fruit from the interstices between the teeth; mechanism for continuously rotating the disk; a pressure device for impaling the fruit on the teeth by rolling contact; a seed removing device, and a fruit stripping device.

4. A fruit seeding machine comprising a disk provided with impaling teeth arranged in circles concentric with the axis of the disk and spaced apart so as to exclude the seeds of the fruit from the interstices between the teeth; mechanism for continuously rotating the disk on its axis; an elastic-surfaced pressure device acting to force the pulp of the fruit below the points of the teeth by rolling contact while the seeds are left on the points of the teeth; a seed removing device; and a fruit removing device.

5. A fruit-seeding machine having in combination a revoluble member having teeth projecting from an end face thereof substantially parallel with the axis, and a revoluble cone-shaped member opposing the teeth and adapted to press the fruit thereagainst.

6. A fruit-seeding machine having in combination a revoluble member with teeth projecting from an end face thereof substantially parallel with the axis; and a revoluble pressure-roll opposing said teeth and revoluble on an axis which is substantially at right-angles to the axis of said member.

7. In a fruit-seeding machine, the combination of revoluble disks each having teeth projecting from an end thereof, substantially parallel with the axis, and pressure rolls opposing the teeth and each revoluble on an axis which is transverse to that of the companion disk, whereby the fruit is pressed against the teeth.

8. In a fruit-seeding machine, revoluble members each having teeth projecting from the end thereof, substantially parallel with the axis, and means to press the fruit against the points, said means consisting of rollers between which and the points the fruit is caused to pass, and shafts radially disposed relative to the axes of the members upon which the rollers are mounted.

9. In a fruit-seeding machine, a revoluble disk having teeth projecting from the end face, substantially parallel with the axis, and means for pressing the fruit against the points, said means consisting of a conical roller turnable upon an axis transverse to the disk axis, and having the surface of the cone contiguous to the points, substantially equidistant therefrom.

10. In a fruit-seeding machine, a revoluble disk having teeth or points projecting from an end, substantially parallel with the axis, and a roller journaled transverse to said axis, with one of its sides in close proximity with the teeth, whereby the fruit delivered between the roller and the points is pressed into the interspaces.

11. In a fruit-seeding machine, a revoluble disk having teeth or points projecting from an end, substantially parallel with the axis, and a cone journaled transverse to said axis, having its sides converging toward the axis of the disk, said cone having one of its sides in close proximity with the teeth, whereby the fruit delivered between the cone and the points is pressed into the interspaces, and the seeds are impaled upon the points.

12. In a fruit-seeding machine, a revoluble disk having teeth or points projecting from an end, substantially parallel with the axis, a cone journaled transverse to said axis, with one of its sides in close proximity with the teeth, whereby the fruit delivered between the cone and the points is pressed into the interspaces, and the seeds are impaled upon the points, and means whereby the seeds are subsequently removed from the points.

13. In a fruit-seeding machine, a revoluble disk having teeth or points projecting from an end, substantially parallel with the axis, a cone journaled transverse to said axis, with one of its sides in close proximity with the teeth, whereby the fruit delivered between the cone and the points is pressed into the interspaces, and the seeds are impaled upon the points, means whereby the seeds are subsequently removed from the points, and other means by which the fruit is afterward removed from the interspaces between the teeth.

14. In a fruit-seeding machine, a disk composed of successive coiled strips having teeth formed upon one edge, corresponding plain strips interposed between contiguous tooth sections, so that the teeth project beyond the edges of the plain sections, and channels are formed between the toothed sections, and means revoluble at right-angles to the disk, for pressing the fruit against the points to impale the seeds thereon and force the fruit into the channels.

15. In a fruit-seeding machine, a disk built up of flexible strips having toothed edges and other interposed strips having smooth edges, said strips being coiled successively to produce a disk of the desired diameter, with the teeth projecting parallel to the axis, a revoluble cone journaled transverse to the axis of the drum with its contiguous face turnable in close contact with the teeth, and means by which the seeds and flesh of the fruit are subsequently removed.

16. A fruit-seeding machine consisting of thin metallic ribbons having teeth or points upon the edges, and other plain-edged ribbons, said ribbons being coiled alternately and said teeth projecting beyond the intermediate plain edges to form channels therewith, means for pressing the fruit against the device to impale the seeds upon the teeth, and press the fruit into the channels, and means to subsequently remove the seeds and fruit successively.

17. In a raisin-seeding machine, a revoluble disk having impaling points upon its end, and a conical presser member operative to impale the fruit on the points.

18. In a raisin-seeding machine, a revoluble disk having impaling points upon its end, and a conical presser member operative to impale the fruit on the points, said conical presser member having its axis arranged radially of the disk.

19. In a raisin seeding machine, a revoluble disk having impaling points upon its end, and a conical presser member having one surface adapted to continuously revolve in contact with the points of the pins.

20. In a raisin seeding machine, a revoluble disk having impaling points upon the surface of its end, and parallel with the axis, a conical revoluble presser member having one surface movable in contact with the points, said member having its axis disposed radially to the axis of the disk.

In testimony whereof I have hereunto set my hand in presence of two subscribing witnesses.

THOMAS H. ELLIOTT.

Witnesses:
  L. T. McKNIGHT,
  ISADOR CARLSON.